United States Patent [19]

Kitamura et al.

[11] 4,404,447
[45] Sep. 13, 1983

[54] METHOD OF MANUFACTURING A WELDED CAN BODY

[75] Inventors: Yoichi Kitamura; Hisashi Hotta, both of Yokohama; Chikara Yurita; Makoto Ito, both of Kawasaki, all of Japan

[73] Assignee: Toyo Seikan Kaisha, Limited, Tokyo, Japan

[21] Appl. No.: 252,330

[22] Filed: Apr. 9, 1981

[30] Foreign Application Priority Data

Apr. 22, 1980 [JP] Japan .................................. 55-52370
Apr. 22, 1980 [JP] Japan .................................. 55-52371

[51] Int. Cl.³ .............................................. B23K 11/32
[52] U.S. Cl. ......................................... 219/64; 219/83
[58] Field of Search ..................... 219/64, 83; 220/454

[56] References Cited

U.S. PATENT DOCUMENTS 3,504,155  3/1970  Opprecht et al. .
4,113,580  9/1978  Tsutsui et al. .
4,160,892  7/1979  Opprecht et al. .

FOREIGN PATENT DOCUMENTS

46-12890   2/1971   Japan .
49-36860   3/1974   Japan .
51-117142  10/1976  Japan .
53-23833   4/1978   Japan .
1539539    1/1979   United Kingdom .

Primary Examiner—Elliot A. Goldberg

[57] ABSTRACT

A method of manufacturing a welded can body from tinplate or a tin-iron alloy plated steel sheet comprises overlapping the opposite marginal portions of a blank of the tinplate or the tin-iron plated steel sheet to form a can body preform having an overlapping portion, applying at least to the cut edges of the marginal portions of the blank a fluxing agent promoting wetting of steel with molten tin, and electrical resistance seam welding the overlapping portion in a nonoxidizing atmosphere by employing a pair of wire electrodes each covered by a layer of metallic tin on the surface thereof facing the overlapping portion. The welded portion has improved corrosion resistance, as an extruded weld portion and a remaining cut edge surface portion thereof are covered with tin transferred from the surfaces of the wire electrodes and/or the tinplate during the welding operation.

10 Claims, 13 Drawing Figures

METHOD OF MANUFACTURING A WELDED CAN BODY

BACKGROUND OF THE INVENTION

1. Field of the Invention

This invention relates to a method of manufacturing a welded can body, and more particularly, to a method of manufacturing a welded can body composed of tinplate or a tin-iron alloy plated steel sheet having a welded portion of which the iron-exposed portion is covered with a tin layer to improve the corrosion resistance of the welded portion.

2. Description of the Prior Art

Tinplate is a sheet of low carbon steel having a surface covered with a layer of metallic tin and a layer of tin-iron alloy formed between the metallic tin layer and the steel substrate. In some special cases, a steel sheet having a surface covered with metallic tin without the tin-iron alloy layer is called tinplate. A tin-iron alloy plated steel sheet is designated herein as a low carbon steel sheet having a surface thereof composed mainly of a very thin layer of a tin-iron alloy which is sometimes inevitably covered thereon with a further thinner layer of metallic tin, as disclosed, for example, in Japanese Laid-Open Patent Specification No. 23833/1978. Such tin-iron alloy plated sheet is inexpensive, as it is plated with only a very small quantity of tin. The tin-iron alloy layer, which is composed essentially of $FeSn_2$, has excellent lacquer adhesion and a higher degree of workability than a layer of metallic chromium on tin free steel, and thus it is less liable to crack. Although the tin-iron alloy has a higher electrode potential than iron in a carbonated soft drink such as Coca-Cola (trademark), the potential difference therebetween is smaller than that between chromium and iron, and the alloy is slightly dissolved in the type of solutions above-mentioned. Accordingly, the tin-iron alloy plated steel sheet of this type is advantageously less liable to local corrosion of iron than tin free steel which is another can making material. As the tin-iron alloy plated steel sheet is liable to rust than tinplate, however, it is usually coated with lacquer before formed to can.

When can bodies for food, beverage or aerosol, or other miscellaneous purposes are manufactured by welding from tinplate, it has been conventional practice to perform electrical resistance seam welding by pressing a pair of oppositely disposed roller electrodes against the overlapping portion of a preformed can body blank with wire electrodes placed therebetween, while supplying an electric current thereto, as disclosed, for example, in Japanese Patent Publication No. 12890/1971 and Japanese Laid-Open Patent Specification No. 117142/1976. The wire electrodes are used to prevent the wear of the roller electrodes, their deformation (formation of a step along the edge of the overlapping portion) and their contamination by tin to thereby eliminate the necessity of any frequent change of the roller electrodes, and avoid any otherwise possible reduction in the working efficiency. The surface tin coating on the welded portion of a can body thus made, however, is decreased, since the greater part of tin on its original surface has been transferred to the wire electrodes with which the overlapping portion has been in contact during welding operation. Furthermore, iron is exposed on the cut edge of the overlapping portion which is not originally coated with tin, and on the extruded weld portion formed from the cut edge, i.e., the substrate portion extruded circumferentially outwardly of the cut edge by the pressure applied during welding operation. A blue or black iron oxide surface is formed if welding is done in the presence of air, while the exposed surface is composed substantially of pure iron if nonoxidizing welding is conducted in an inert gas atmosphere. Accordingly, the welded side seam of the can body is extremely inferior to the other portion thereof in corrosion resistance.

A tin-iron alloy plated steel sheet has poorer workability in electrical resistance welding than tinplate, apparently because its tin-iron alloy layer has a higher degree of electrical insulation than a layer of metallic tin, and is too hard to fit the welding electrodes tightly. In applying a conventional method for electrical resistance seam welding, a splash of molten iron is likely to scatter and adhere around the welded portion, and to cause iron exposure thereon. Such exposed iron is very difficult to be covered completely by reparing materials such as a lacquer, a plastic powder or film. Moreover, a cavity or void is likely to form in the welded portion, and thus, it is extremely difficult to obtain an excellent welded can which can preserve contents. In this connection, it may be thought to remove the tin-iron alloy by a mechanical means such as a milling cutter, or chemical dissolution from the marginal portions of a can body blank to be overlapped on each other before welding. The removal of the alloy, however, exposes iron in the welded portion of the can body and lowers its corrosion resistance, while at the same time, it naturally leads to an increase in the cost of manufacture. Even if a generally good weld may be obtained under limited welding conditions without removal of any tin-iron alloy from the marginal portions of the can body blank, iron is still exposed on the substrate portion extruded from the cut edge of the marginal portions to be welded together, and on the remaining cut edge surface. Therefore, the welded portion of the can body formed from a tin-iron alloy plated steel sheet is inferior to the other portion thereof in corrosion resistance, as in the case of the tinplate can body.

SUMMARY OF THE INVENTION

It is an object of this invention to provide a method of manufacturing a welded can body from tinplate or a tin-iron alloy plated steel sheet, wherein the can body has a welded portion of which the corrosion resistance is improved by a layer of tin covering the extruded weld portion surface and the remaining cut edge surface.

It is another object of this invention to provide a method of manufacturing a welded can body from tinplate or a tin-iron alloy plated steel sheet, wherein the can body has a welded portion of which the corrosion resistance is improved by forming the aforesaid layer of tin simultaneously during welding with high productivity, instead of thereafter.

It is still another object of this invention to provide a method of manufacturing a welded can body from tinplate or a tin-iron alloy plated steel sheet having a welded portion of improved corrosion resistance by ensuring that a relatively large amount of tin remains on those surfaces of the welded portion which contact the wire electrodes during welding operation.

It is a further object of this invention to provide a method of manufacturing a welded can body from a tin-iron alloy plated steel sheet which enables formation of an excellent weld under a relatively wide range of welding conditions without removal of any tin-iron alloy from the marginal portions of a can body blank to be welded together.

According to the invention, there is provided a method of manufacturing a welded can body from tinplate or tin-iron alloy plated steel sheet, said method including overlapping the opposite marginal portions of a blank of tinplate or tin-iron alloy plated steel sheet to form a can body preform having an overlapping portion, and disposing said overlapping portion between a pair of wire electrodes supported by a pair of supporting electrodes for electrical resistance seam welding.

The method further comprises the steps of providing as said wire electrodes a pair of wire electrodes each having a flat surface facing said overlapping portion, said flat surface being greater in width than said overlapping portion, and covered or not covered with metallic tin; applying at least to the cut edges of said marginal portions of said blank a fluxing agent promoting wetting of steel with molten tin; bringing said flat surfaces of said wire electrodes into contact with said overlapping portion; and conducting said electrical resistance seam welding in a nonoxidizing atmosphere to form a welded portion, whereby tin transferred from the surfaces of said wire electrodes and/or the tinplate during the welding operation covers an extruded weld portion and a remaining cut edge surface portion of said welded portion.

BRIEF DESCRIPTION OF THE DRAWINGS

FIGS. 7 and 8 are X-ray photographs by an electron probe microanalyser each showing the amount of tin remaining on the surface portion of the welded portion of a welded tinplate can body which contacted the wire electrode, FIG. 7 showing the result obtained when no fluxing agent was used, while FIG. 8 shows the result obtained with the aid of a fluxing agent.

DETAILED DESCRIPTION OF THE PREFERRED EMBODIMENTS

Figure 1:
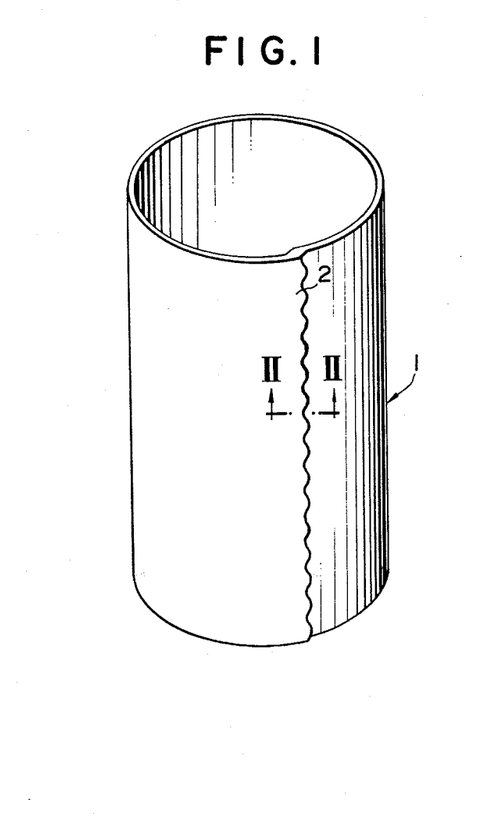
FIG. 1 is a perspective view showing by way of example a welded can body manufactured by the method of this invention.
Figure 2A:
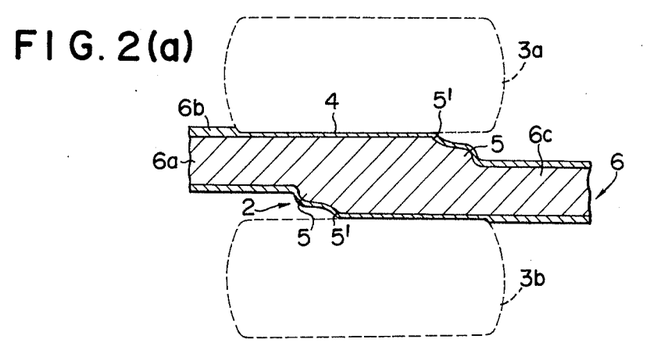
FIG. 2(a) is an enlarged transverse cross-sectional view taken along the line II—II of FIG. 1, and illustrating the cross section of the welded portion of a welded tinplate can body.

Referring first to FIG. 1 of the drawings, there is shown a welded can body 1 manufactured by the method of this invention, and having an overlapped welded portion 2 formed by seam welding. The can body 1 may be formed either from tinplate, or from a tin-iron alloy plated steel sheet. FIG. 2(a) is an enlarged cross sectional view of the welded portion 2 in the welded can body 1 made from tinplate. The welded portion 2 comprises surface portions 4 contacting wire electrodes 3a and 3b, remaining cut edges 5', and extruded weld portions 5. The unwelded portion 6c of tinplate 6 is contiguous to the surface portions 4 contacting the electrodes, and the extruded weld portions 5. The tinplate 6 comprises a low carbon steel sheet 6a defining a substrate, and a tin layer 6b covering each side of the substrate. The term "tin layer" as herein used refers to both a layer of metallic tin, and a combination thereof with a layer of a tin-iron alloy. Each extruded weld portion 5 is formed when a pressure applied during welding operation causes the cut edge 8 of an overlapping portion 7 to project circumferentially outwardly, leaving a remaining cut edge surface portion 5' (see FIGS. 2(a) and 3). Part of tin on the surface portions 4 is transferred to the wire electrodes 3a and 3b during welding operation, but a certain amount of tin still remains on the surface portions 4, though it is smaller than the amount of tin on the unwelded portion 6c. According to the method of this invention, it is possible to ensure a far greater amount of tin remaining on the surface portions 4 than that obtained by any known method.

In the can body manufactured by the method of this invention, the remaining cut edge surface portions 5' and the extruded weld portions 5 are also covered with a tin layer 6b. A tin layer 6b uniformly covering all of those portions is, of course, preferred, but as it is in fact difficult to obtain any such uniform coating, it is possible that there may be an unevenness in coating thickness, or that some portion or portions may remain uncoated, and expose iron. From the standpoint of corrosion resistance, however, it is desirable that the ratio of the total area of such uncoated portions to the surface area of the remaining cut edge surface portions and the extruded weld portions should be not more than that of the exposed iron area of the tinplate employed to the total surface area thereof. The ratio of any such exposed iron area can be determined by the ferroxyl test as specified in JIS H0402 and H8612, the ammonium thiocyanate test, or the electrochemical method as proposed in Japanese Patent Application No. 105081/1979, or otherwise. As the welding of a can body according to this invention is carried out in a nonoxidizing atmosphere, there does not occur exposure of any blue or black, relatively thick iron oxide of the type found in the welded portion of any known can body.

Figure 2B:
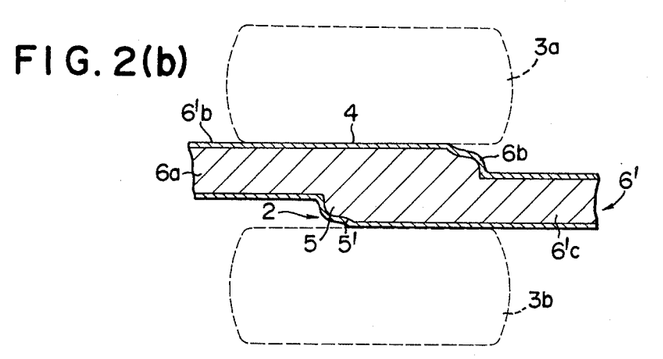
FIG. 2(b) is a view similar to FIG. 2(a), but showing the cross section of the welded portion of a welded can body formed from a tin-iron alloy plated steel sheet.
Figure 2C:
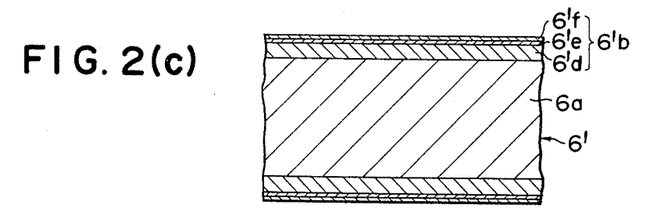
FIG. 2(c) is a vertical sectional view of an example of a tin-iron alloy plated steel sheet.

Referring now to FIG. 2(b), there is shown an enlarged cross section of the welded portion 2 of a welded can body formed from a tin-iron alloy plated steel sheet as generally designated by numeral 6'. Like numerals indicate like parts throughout FIGS. 2(a) and 2(b). The term "a tin-iron alloy plated steel sheet" means a low carbon steel sheet 6a covered by a layer 6'b consisting substantially of a very thin, dense tin-iron alloy layer 6'd composed mainly of $FeSn_2$. The tin-iron alloy layer 6'd may be sometimes inevitably covered with a further thinner layer 6'e of metallic tin, as shown in FIG. 2(c). The layer 6'b preferably has a thickness corresponding to a tin weight in the range of 0.05 to 1.0 $g/m^2$. This thickness refers to that of the layer on each surface of the sheet throughout this specification. A thickness corresponding to a tin weight below 0.05 $g/m^2$ results in poor corrosion resistance, while a thickness corresponding to a tin weight above 1.0 $g/m^2$ lowers the workability of the sheet, and makes it liable to crack, leading to poor corrosion resistance in a formed portion. Moreover, such thickness is not expected to improve the corrosion resistance of the unformed portion of the sheet, but only brings about an increase in the material cost. The tin-iron alloy layer may be formed by coating a thin layer of tin on the surface of a low carbon sheet by a conventional method, and then melting the tin by a known method such as electrical resistance heating, induction heating or solid diffusion. It is desirable from the standpoint of pitting corrosion resistance that the alloy layer be so dense that there is no exposure of substrate iron. Such an alloy layer can be formed by plating a dense layer of tin by using a weakly acid bath having a low tin ion concentration or a known alkaline bath under those conditions in which a large quantity of hydrogen is evolved, and then by melting of tin as hereinabove described. A slight amount of metallic tin which may be unavoidably remained on the surface may be left as it is.

In order to improve the lacquer adhesion to the alloy layer 6'd or a very thin layer 6'e of metallic tin thereon, it is desirable to cover it with a very thin layer 6'f of hydrated chromium oxide having a thickness corresponding to a chromium weight of 0.005 to 0.05 $g/m^2$. A smaller thickness of the layer than that corresponding to a chromium weight of 0.005 $g/m^2$ will result in poor lacquer adhesion, while a greater thickness than that corresponding to a chromium weight of 0.05 $g/m^2$ will lower lacquer adhesion in a formed portion. Such a hydrated chromium oxide layer may be formed by a known method, such as cathodic treatment in a bath of sodium bichromate used for the after-treatment of electroplated tinplate, or a bath prepared by adding a catalyst such as sulfuric acid into an aqueous solution of chromic anhydride, as in the manufacture of tin free steel.

Figure 3:
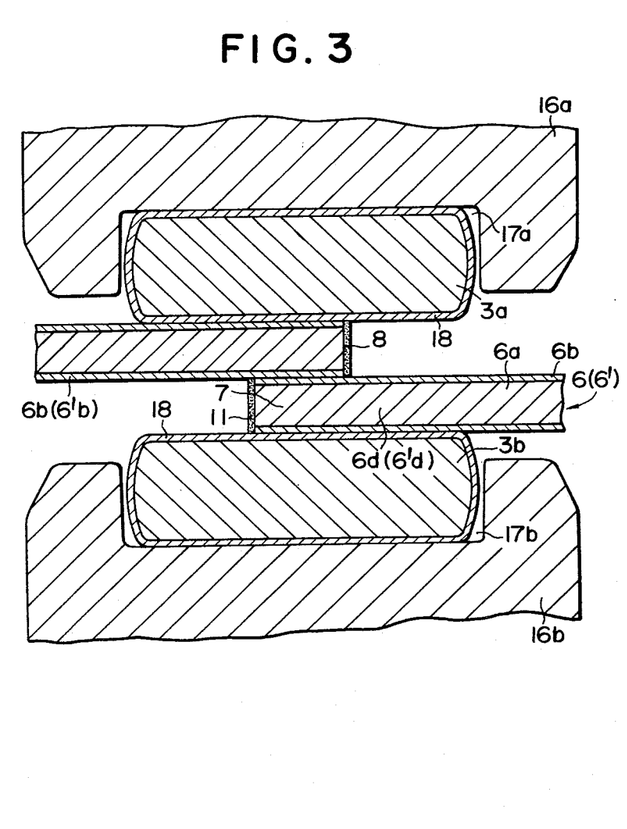
FIG. 3 is a vertical cross-sectional view schematically showing the overlapping portion of a can body preform immediately prior to welding.

As shown in FIG. 2(b), the remaining cut edge surface portions 5' and the extruded weld portions 5 are also coated with a tin layer 6b. The surfaces of the wire electrodes 3a, 3b at least facing the marginal portion 6'd are each covered with metallic tin layer 18 (FIG. 3). Under the action of a fluxing agent, the metallic tin of the metallic tin layer 18 is melted, and flows onto the surfaces of the extruded weld portions 5 and the remaining cut edge surface portions 5', as will hereinafter be described in further detail. It is preferable that the tin layer 6b be formed uniformly, but practically may have an uneven thickness, or include an uncoated portion. It is, therefore, usual to apply a lacquer to the welded portion 2. The presence of such a very small uncoated portion will not affect so adversely in filiform corrosion, iron pickup, or lacquer adhesion and the like.

The method of this invention will now be described by way of example for the manufacture of a welded can body from tinplate with reference to FIGS. 3 and 4.

According to this invention, it is usual to use tinplate having a thickness of about 0.15 to 0.3 mm, a tin coating weight of about 1.1 to 11.2 $g/m^2$ on each surface, and a tin-iron alloy weight of about 0.3 to 1.5 $g/m^2$ in terms of the weight of tin. These figures, however, do not limit the scope of this invention.

Figure 4:
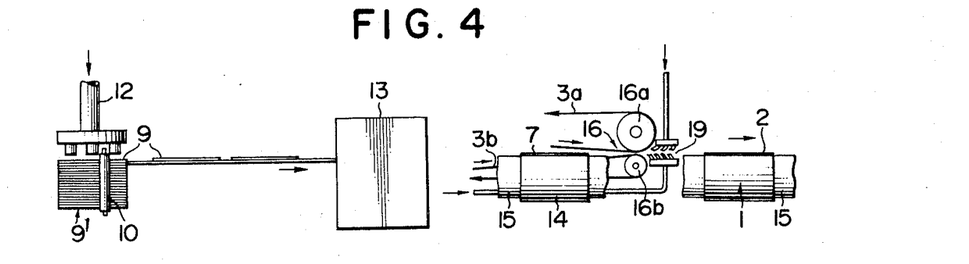
FIG. 4 is a front elevational view illustrating by way of example an apparatus for carrying out the method of this invention.

Tinplate is cut into a can body blank 9 having a predetermined size; and a multiplicity of blanks 9 are laid one upon another to form a stack 9', as shown in FIG. 4. A fluxing agent 11 (FIG. 3) is coated by rollers 10 on an opposite cut edge of the blanks 9 defining the cut edge of the overlapping portion to be welded together. The water or solvent in the fluxing agent is removed by vaporization by a hot air drier 12. It is, of course, possible to use any other appropriate means, such as a spray and a brush, for applying the fluxing agent. It is also possible to apply the fluxing agent to each blank or a plurality of blanks together at any appropriate time, whether before or after they are stacked. There is no problem, even if the fluxing agent may be applied to some extent to the surface of the marginal portion 6d corresponding to the overlapping portion 7 beyond the cut edge 8.

The fluxing agent must be capable of promoting the wetting of steel surfaces with molten tin. Suitable examples of the fluxing agent include (1) a rosin flux such as pure or activated rosin, (2) a carboxylic acid such as stearic acid, oleic acid, palmitic acid, benzoic acid, tartaric acid, furancarboxylic acid and phthalic acid, (3) an organic base such as aniline, urea, ethylenediamine, acetamide, ethanolamine, other amines and amides, and their hydrohalogenic acid salts, (4) an inorganic salt such as zinc chloride, ammonium chloride, potassium chloride, magnesium chloride, stannous chloride, and other metal chlorides, and (5) a mixture of two or more of the aforesaid fluxes. The fluxing agent is usually used in the form of a solution obtained by dissolution in water or any other appropriate solvent.

It is further preferable to choose a fluxing agent which is easy to vaporize at a high temperature prevailing during welding operation without remaining residues in the welded portion, or which is turned non-corrosive during welding even if it remains in the welded portion.

The fluxing agent used according to this invention is different from an agent for promotion of resistance heat generation disclosed in Japanese Patent Publication No. 36860/1974 with respect to its composition and function and effect.

The blanks 9 are then fed into a can body performing machine 13 such as of a roll forming type by an appropriate conveying device not shown, in which each blank 9 is formed into a can body preform 14. The preform 14 is then transferred to a welding roller electrode assembly 16 along a mandrel 15 by a conveying mechanism not shown. The roller electrode assembly 16 comprises an upper roller electrode 16a and a lower roller electrode 16b disposed opposite to the upper roller electrode. The roller electrodes 16a and 16b are formed on their outer peripheral surfaces with grooves 17a and 17b, respectively. The wire electrodes 3a and 3b pass through the grooves 17a and 17b, respectively, and have a thickness which is greater than the groove depth, as shown in FIG. 3. The roller electrodes support the wire electrodes, and apply pressure to the overlapping portion of the preform and supply an electric current thereto through the wire electrodes. As such, it is possible to use a pair of elongated electrodes, or a combination of an elongated electrode and a roller electrode instead of the roller electrodes 16a and 16b. The wire electrodes 3a and 3b are usually formed from copper or a copper alloy, and each wire electrode has a flat surface at least in that portion in which it is brought into contact with the overlapping portion 7 of the preform 14. It is preferable for the flat surface of the wire electrodes to be greater in width than the overlapping portion, so that they may be able to apply a uniform welding pressure onto the entire surface of the overlapping portion 7 so as not to leave any unwelded area in the overlapping portion 7. At least that surface of each wire electrode which faces the overlapping portion 7 is preferably covered with a layer of metallic tin 18, so that the tin may be melted and flow along the cut edge 8 by virtue of the wetting action of the fluxing agent to cover the remaining cut edge surface portion 5' and the extruded weld portion 5 [see FIG. 2(a)]. If tinplate is coated with a large quantity of tin, and has a small thickness, however, the metallic tin layers 18 may not be necessary, since the tin on tinplate per se covers the remaining cut edge surface portion 5' and the extruded weld portion 5. If tinplate has a tin coating weight not exceeding about 2.8 g/m$^2$, however, it is desirable to provide each wire electrode with a metallic tin layer 18 having a weight of about 6 to 17 g/m$^2$. A tin coating weight in the layer 18 below about 6 g/m$^2$ usually fails to cover the remaining cut edge surface portion 5' and the extruded weld portion 5 with a tin layer 6b which is sufficiently thick to render those portions resistant against corrosion. This limitation to the minimum tin coating weight is also important to ensure an increase in the tin remaining on the surface portion 4 contacting with the wire electrode to improve its corrosion resistance. A greater weight than about 17 g/m$^2$ is, however, to be avoided, since tin tends to cause slip between the welded portion and the wire electrode, thereby leading to local exposure of iron with a resultant reduction in the corrosion resistance of the welded portion as a whole, although the overall quantity of tin remaining on the welded portion is increased. The use of such a great amount of tin is also disadvantageous, since it is not expected to provide any further improved coating layer on the remaining cut edge surface portion 5' and the extruded weld portion 5, but results, on the contrary, in a non-uniformity of the welding strength and an increase in the tin cost.

In order to ensure smooth transfer of tin to the cut edge 8 of the overlapping portion 7, it is necessary to protect the remaining cut edge surface portion 5' and the extruded weld portion 5 against oxidation during welding operation. Accordingly, the arrangement shown in FIG. 4 includes a device 19 provided downstream of the roller electrode assembly 16 for supplying an inert gas such as nitrogen and argon to maintain a non-oxidizing atmosphere in an area through which the welded portion passes. Thus, it is possible to obtain a welded product of which the welded portion 2 presents as beautiful as a metallic color of any other portion thereof.

Figure 5:
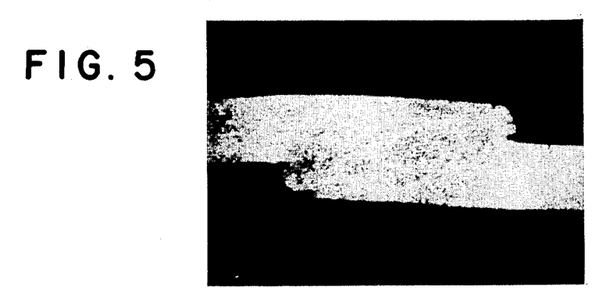
FIG. 5 is a metallurgical microphotograph showing by way of example in a cross section perpendicular to the weld line the welded portion of a welded tinplate can body manufactured by the method of this invention.

The welding conditions, such as welding pressure and current or the like, must be selected so as to accomplish forge welding to form a solid seam as shown in FIG. 5 which is a microphotograph of 65 magnifications showing a welded portion in cross section as etched with alcohol containing 5% of nitric acid. A melt welding must be avoided, since the tinplate loses its corrosion resistance as the tin in its surface layer is dissolved into the steel. Moreover, a cavity may be formed in the welded portion after it has been cooled, resulting in a can body lacking gas tightness, or a brittle quenched structure is developed in the steel, resulting in the flange portion liable to crack. In the selection of the welding conditions, it is also necessary to ensure prevention of molten steel from splashing on the welded portion and its vicinity, since such splash can cause exposure of iron. A higher current frequency is required with the increase in the welding speed. A welded can body 1 is delivered to a next step of operation along the mandrel 15.

Substantially the same procedures may be employed for making a welded can body from a tin-iron alloy plated steel sheet, but some additional consideration is required in view of the fact that the sheet material has only an extremely thin layer of metallic tin, even if it has. It is desirable to apply the fluxing agent not only to the cut edge of the marginal portion of the overlapping portion of the blank 9 to be welded together, but also to the opposite surfaces of the marginal portion. It is, however, usually sufficient to apply the fluxing agent 11 only to the cut edges of the blanks 9 in the stack 9' by the rollers 10, since a capillary action causes the fluxing agent 11 to penetrate into the clearances between every two adjoining blanks 9 to thereby cover the opposite surfaces of the marginal portion thereof. The wetting action of the fluxing agent improves the fitness between the molten tin on the wire electrodes and the tin-iron alloy plated steel sheet on the can body preform, and their weldability. In other words, the welding operation can be performed in a wider range of electric current. The coating weight of a layer of metallic tin 18 on each wire electrode 3a or 3b is preferably in the range of about 6 to 25g/m$^2$. Its upper limit is higher than in the case where tinplate is used (about 17 g/m$^2$). If this upper limit is not exceeded, there is virtually no slip of molten tin between the welded portion and the wire electrodes.

The invention will now be described in further detail with reference to examples.

EXAMPLE 1

Blanks each measuring 125 mm wide by 206 mm long were prepared from electrolytic tinplate having a thickness of 0.23 mm, and a tin coating weight of 5.6 g/m$^2$ on one surface defining the inner surface of a can body, and 2.8 g/m$^2$ on the other surface defining the outer surface of the can body. A fluxing agent comprising 15 parts by weight of oleic acid, two parts by weight of glycerin, one part by weight of monoethanolamine hydrochloride, 1.5 parts by weight of water and 80.5 parts by weight of isopropyl alcohol was applied by rubber rollers to both of the widthwise cut edge surfaces of the blanks, and the solvent was removed by vaporization with hot air. A can body perform having a length of 125 mm, a diameter of 65.3 mm and an overlapping portion width of 0.4 mm was prepared from each blank by a roll forming machine.

The welding apparatus included a pair of roller electrodes for the inner and outer surfaces, respectively, of a can body. The roller electrode for the inner surface of the can body had a diameter of 62 mm, and the roller electrode for the outer surface of the can body was 110 mm in diameter. Each wire electrode comprised a round mild copper wire flattened by flat rolling, and having a width of 2.1 mm and a thickness of 1.0 mm. The wire electrodes were of the shape shown in FIG. 3. Five sets of wire electrodes having a tin coating weight of 0 g/m$^2$, 4.5 g/m$^2$, 11 g/m$^2$, 16 g/m$^2$ and 22 g/m$^2$, respectively, were employed. An inert gas atmosphere was provided by nitrogen blown against the welded portion at a rate of 10 liters per minute. The welding conditions included a welding force of 45 kg, an electric current of 4.5 to 4.7 kA, a frequency of 250 Hz and a welding rate of 30 meters per minute.

Figure 6:
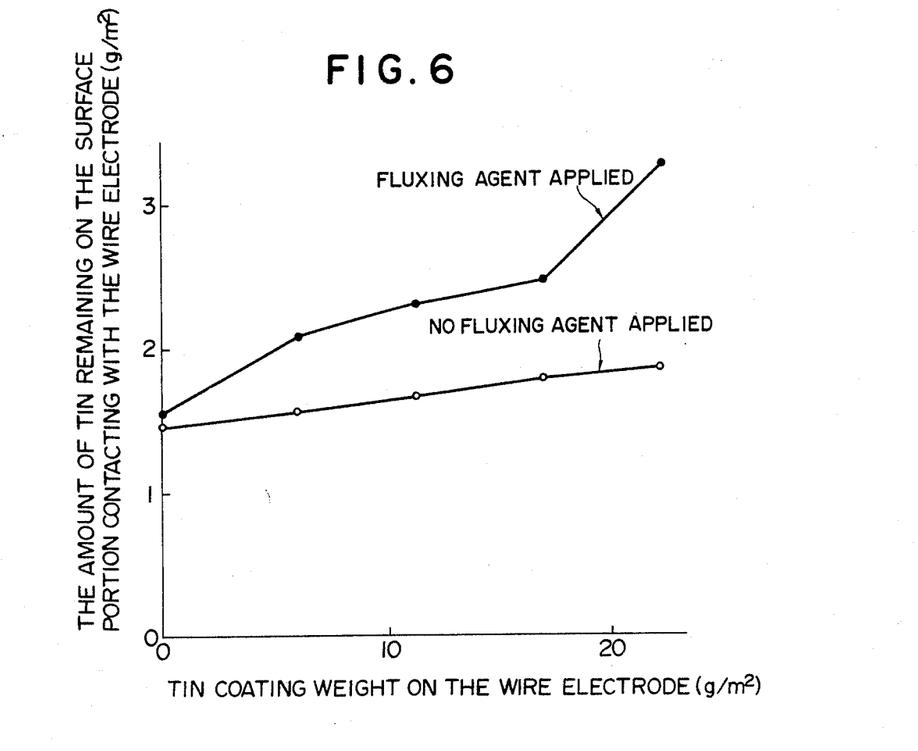
FIG. 6 is a graph showing the relationship observed between an amount of tin on the wire electrode and an amount of tin remaining on the surface portion of the welded portion which contacted the wire electrode, both when a fluxing agent is used, and when no fluxing agent is used, during the manufacture of a welded tinplate can body.

For comparison purposes, welded can bodies were prepared under exactly the same conditions, except that no fluxing agent was applied to the cut edge surfaces of the blanks. The amount of tin on the inner surface of the welded portion contacting the corresponding wire electrode was determined by operating a beam on an electron probe microanalyser over an area of 0.063 mm$^2$, and comparing the results with a calibration graph. The results are shown in FIG. 6 (n=8). As is obvious from FIG. 6, the amount of tin remaining on the surface portion contacting the wire electrode increases with the wire electrode coated with tin and with a fluxing agent applied to the welded portion.

Figure 7:
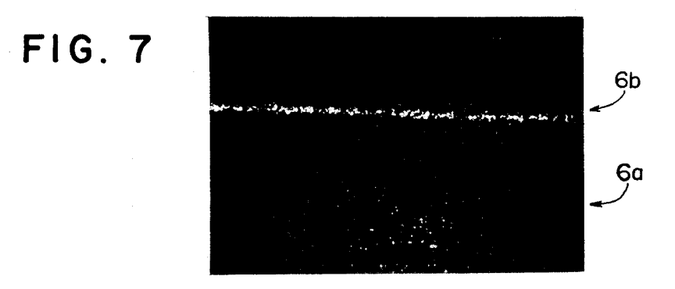
Figure 8:
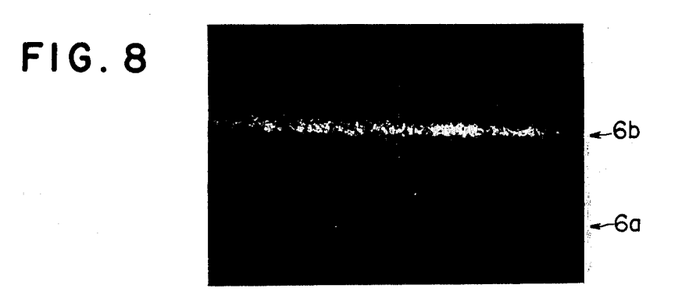
Figure 9:
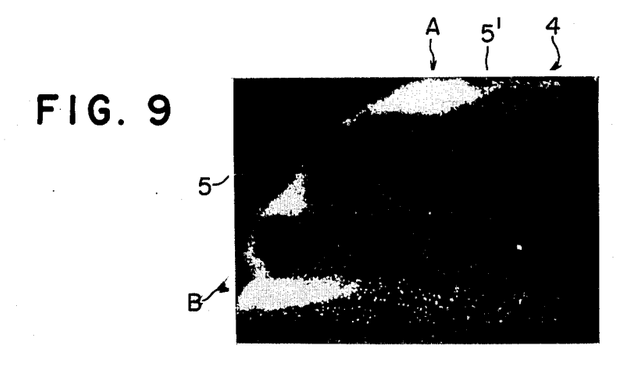
FIG. 9 is an X-ray photograph by an electron probe microanalyser showing the cross section of an extruded portion on the welded portion of a welded tinplate can body.

FIGS. 7 and 8 show the X-ray photographs of 400 magnifications taken by an electron probe microanalyser (Sn-L$_\alpha$rays) of welded portions in cross section in the areas close to their surfaces. FIG. 7 shows the welded portion of Sample No. 1 in TABLE 1 (formed without using the wire electrodes coated with tin, and applying a fluxing agent), while FIG. 8 shows that of Sample No. 8 (formed by using wire electrodes having a tin coating weight of 11 g/m$^2$, and applying a fluxing agent). The results shown in FIGS. 7 and 8 corresponds very well to those of FIG. 6. The quantity of tin on the remaining cut edge surface portions and the extruded weld portions was difficult to determine by a electron probe microanalyser, since they had a curved, rather than flat, surface. However, as apparent from FIG. 9 showing the X-ray photograph of 400 magnifications taken by an electron probe microanalyser (Sn-L$_\alpha$rays) of an extruded weld portion and its vicinity in Sample No. 8 in cross section, the substantially entire surfaces of the remaining cut edge surface portion and the extruded weld portion were found to be covered with a tin layer (white portion in the photograph). A relatively thick tin layer is observed in the boundary between the extruded weld portion and the surface portion contacting the wire electrode, as shown at A in FIG. 9. This layer appears to have been formed by deposition of the molten tin forced out from the interface between the wire electrode and the marginal portion of the blank, without being able to flow sufficiently along the surfaces of the remaining cut edge surface portion and the extruded weld portion. A thick tin layer is also found at the lower end of the extruded weld portion as shown at B. This layer likewise appears to have been formed by deposition of the molten tin forced out from the interface between the upper and lower marginal portions at the overlapping portion.

TABLE 1 shows the test results concerning the amount of iron exposed on the welded portion, and its rust resistance evaluated by a salt water spray test. For comparison the results of normal tinplates are also shown in TABLE 1. As is obvious from the results shown in TABLE 1, the method of this invention employing a fluxing agent renders the extruded weld portion on the welded portion substantially comparable to that of a normal state of tinplate in rust resistance. This is assumed to be due to the very little iron exposure in the extruded weld portion as is obvious from the results of the iron exposure tests. The method of this invention also improves the rust resistance of the surface portion contacting the wire electrode by virtue of an increase in the amount of tin remaining thereon. It is noted that the surface portion contacting with the wire electrode of Sample No. 10 is inferior to that of Sample No. 9 in rust resistance despite the fact that the former carries a greater amount of residual tin thereon. This is apparently due to a local increase of iron exposure caused by a slip due to an excessive tin during welding operation.

TABLE 1

| | Sample No. | Tin Coating Weight on Wire Electrodes (g/m$^2$) | Fluxing Agent | Iron[2] Exposure (mA) | Salt Spray Test[3] | |
|---|---|---|---|---|---|---|
| | | | | | Extruded Weld Portion | Surface Portion Contacting with Wire Electrode |
| Comparative Examples | 1 | 0 | Not applied | 53 | 2.6 | 3.0 |
| | 2 | 4.5 | Not applied | 50 | 2.7 | 2.8 |
| | 3 | 11 | Not applied | 41 | 2.8 | 2.0 |
| | 4 | 16 | Not applied | 34 | 2.4 | 1.8 |
| | 5 | 22 | Not applied | 34 | 2.0 | 2.2 |
| This Invention | 6 | 0 | applied | 34 | 1.6 | 2.8 |
| | 7 | 4.5 | applied | 25 | 1.3 | 2.5 |
| | 8 | 11 | applied | 17 | 1.2 | 2.0 |
| | 9 | 16 | applied | 3 | 1.0 | 1.0 |
| | 10 | 22 | applied | 10 | 1.0 | 1.6 |
| Tinplate[1] | 11 | 2.8* | — | 4 | 1.0 | |
| | 12 | 5.6* | — | 3 | 1.0 | |

TABLE 1-continued

|  | Tin Coating Weight on Wire Electrodes (g/m²) | Fluxing Agent | Iron[2] Exposure (mA) | Salt Spray Test[3] | |
|---|---|---|---|---|---|
| Sample No. | | | | Extruded Weld Portion | Surface Portion Contacting with Wire Electrode |
| 13 | 11.2* | — | 1 | 1.0 | |

Notes:
[1] Normal electrolytic tinplates which had been free from any scratch or other defect before they were welded. Mark * indicates tin coating weight in g/m².
[2] The tests were conducted in accordance with the procedures described in Japanese Patent Application No. 105081/1979. A test specimen of the welded portion was cut 10 mm wide by 100 mm long along the axis of a can, and its central portion of 100 mm long was left exposed to define a surface portion contacting with the wire electrode, a remaining cut edge surface portion and an extruded weld portion, and then the remaining area was completely sealed with wax. For each electrolytic tinplate, a test specimen measuring 10 mm wide by 125 mm long, and having a surface free from any scratch or other defect was cut, and while an exposed portion having the same area as that of a welded test specimen was left in its central portion, the rest of the specimen was completely sealed with wax. These specimens were electrolyzed as an anode for 60 seconds in a 1,000 ml beaker with an electrolyte having a pH value of 9.5, containing a sodium carbonate of 0.15 M, a sodium bicarbonate of 0.15 M and a chlorine ion concentration of 0.005 M, with a cathode of platinum, and with a potential of 1.3 V relative to a saturated silver chloride reference electrode. The electrolytic current thus measured is proportional to the area of exposed iron.
[3] A specimen measuring 3 cm wide by 125 cm and having the welded portion in its center was cut for the test. A tinplate specimen was also of the same dimensions. A 5% aqueous solution of sodium chloride having a temperature of 37° C. was sprayed for 15 minutes on that side of each specimen which defined the inner surface of a can body. The welded portion was checked for its degree of rusting. Grade 1 indicates that the specimen did not show any appreciable amount of rust, and Grade 3 indicates heavy rust, while n = 5.

EXAMPLE 2

A cold rolled steel strip having a thickness of 0.23 mm and a hardness of 62 (Rockwell 30T) was degreased and pickled in a conventional way, and electroplated with tin on both sides to provide three kinds of tin-iron alloy plated steel sheets as shown in TABLE 2, under the following conditions:
Bath composition:
  Stannous sulfate 40 g/liter
  Phenolsulfonic acid (60% solution) 40 g/liter
  Ethoxylated α-naphtholsulfonic acid 5 g/liter
Bath temperature: 45° C.
Current density: 7 A/dm²

The strip was, then, directly heated by electrical resistance for 0.9 second to a temperature above the melting point of tin for conversion of almost all the tin into a tin-iron alloy, followed by quenching in water.

Then, it was subjected to cathodic treatment in an aqueous solution of sodium dichromate (30 g/liter) having a temperature of 50° C. at a current density of 10 A/dm², whereby a hydrated chromium oxide layer having a weight of 0.015 g/m² in terms of chromium was formed on the surface. After it was electrostatically coated with 4.5 mg/m² of cottonseed oil, it was cut into a tinplate size.

Blanks having a width of 125 mm and a length of 206 mm were prepared from each sheet thus made and stacked together. A fluxing agent comprising 15 parts by weight of oleic acid, one part by weight of monoethanolamine hydrochloride, two parts by weight of glycerin, 1.5 parts by weight of water and 80.5 parts by weight of isopropyl alcohol was applied to the opposite widthwise cut edge surfaces of the blanks together by rubber rollers. Hot air was blown against the blanks to remove the solvent by vaporization. Some of the blanks were not coated with the fluxing agent to provide comparative samples. A can body preform having a length of 125 mm, a diameter of 65.3 mm and an overlapping width of 0.4 mm was prepared from each blank by a roll forming machine.

The welding apparatus comprised a roller electrode for the inner surface of a can body, and a roller electrode for its outer surface. The roller electrode for the inner surface of a can body had a diameter of 62 mm, while the electrode for its outer surface was 110 mm in diameter. Each wire electrode comprised a tin electroplated round mild copper wire having a tin coating weight of 11 g/m², and flattened by flat rolling, as shown in FIG. 3. It had a width of 2.1 mm and a thickness of 1.0 mm. Mild copper wire electrodes of the same dimensions not plated with tin were also employed for comparison purposes.

The welding operation was conducted at a welding force of 45 kg, a current frequency of 50 Hz and a welding rate of 7 meters per minute, while nitrogen was being blown at a rate of 10 liters per minute. Tests were conducted to obtain a range of electric current permitting welding without causing any splash. Welded cans for testing purposes were prepared by welding within the range of electric current obtained, and subjected to salt water spray tests, iron exposure tests and iron pickup tests.

The results are shown in TABLE 2, including results on normal tin-iron alloy plated steel sheets for comparison. It is noted that according to the method of this invention employing a fluxing agent, a wide range of electric current is available for welding to facilitate formation of an excellent welded portion having a substantially equal area of exposed iron to that of the unwelded portion, and that while it is fairly rust resistant even if not coated with lacquer, it is also highly resistant to pitting corrosion with little iron solution into coke when coated with a lacquer.

Figure 10:
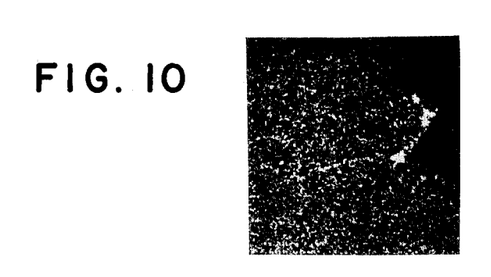
FIGS. 10 and 11 are X-ray photographs by an electron probe microanalyser showing the cross section of an extruded portion on the welded portion of a welded can body formed from a tin-iron alloy plated steel sheet, FIG. 10 showing a weld formed by a method known in the art, and FIG. 11 a weld by the method of this invention.
Figure 11:
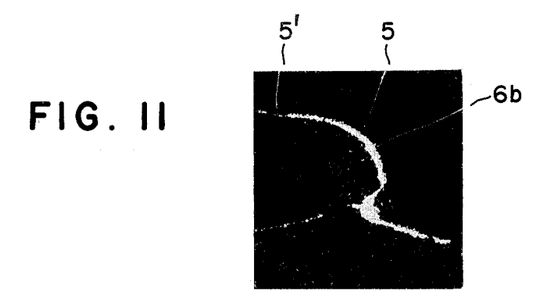

The cross sections of Samples Nos. 3 and 9 at their extruded weld portions and their vicinity were examined by an electron probe microanalyser. The X-ray (Sn-L$_{60}$ ray) photographs of 250 magnifications thus obtained are shown in FIGS. 10 and 11, respectively. As the white areas in the photographs indicate the presence of tin, it is noted that Sample No. 9 prepared according to the method of this invention has the extruded weld portion and the remaining cut edge surface portion both covered fully with a tin layer (FIG. 11).

TABLE 2

| | Sample No. | Tin Coating on Wire Electrode | Fluxing Agent | Tin-Iron Alloy Layer Thickness Indicated As Tin (g/m²) | Current Available for Welding | | Salt[1] Spray Test | Iron[2] Pickup (mg/2 cm²) | Iron[3] Exposure (mA) |
|---|---|---|---|---|---|---|---|---|---|
| | | | | | Current (A) | Range (A) | | | |
| Comparative Examples | 1 | None | Not Used | 0.3 | 1,840 | 0 | 5 | 0.46 | 70 |
| | 2 | None | Not Used | 0.4 | 1,900 | 0 | 4 | 0.39 | 60 |
| | 3 | None | Not Used | 0.5 | 1,920 ~1,970 | 50 | 4 | 0.26 | 55 |
| Comparative Examples | 4 | Yes | Not Used | 0.3 | 2,500 ~2,550 | 50 | 5 | 0.40 | 60 |
| | 5 | Yes | Not Used | 0.4 | 2,550 | 0 | 4 | 0.24 | 55 |
| | 6 | Yes | Not Used | 0.5 | 2,540 ~2,650 | 110 | 4 | 0.30 | 45 |
| This Invention | 7 | Yes | Used | 0.3 | 2,170 ~2,300 | 130 | 3 | 0.14 | 25 |
| | 8 | Yes | Used | 0.4 | 2,300 ~2,410 | 110 | 3 | 0.14 | 20 |
| | 9 | Yes | Used | 0.5 | 2,300 ~2,530 | 230 | 1 | 0.12 | 13 |
| Tin-Iron[4] Alloy Plated Steel Sheet | 10 | | | 0.3 | | | 2 | 0.13 | 20 |
| | 11 | | | 0.4 | | | 1 | 0.11 | 17 |
| | 12 | | | 0.5 | | | 1 | 0.10 | 14 |

Notes:
[1]A 5% aqueous solution of sodium chloride having a temperature of 37° C. was sprayed for 30 minutes. n = 5. Grade 1 indicates the minimum degree of rusting on the welded portion, while Grade 5 shows the maximum degree of rusting.
[2]An epoxyphenolic resin lacquer was applied on the welded portion in the amount of 60 mg/dm², and baked. The samples were immersed for seven days in 200 ml of coke at 37° C., and the amount of iron dissolved in coke was determined.
[3]The tests were conducted in accordance with the procedures disclosed in Japanese Patent Application No. 105081/1979 as described in Note[2] for Example 1.
[4]Normal tin-iron alloy plated steel sheets having no scratch or other defect were tested for salt spray test, iron pickup and iron exposure in accordance with the procedures set forth in [1] to [3] above.

What is claimed is:

1. In a method of manufacturing a welded can body from a surface treated steel sheet selected from the group consisting of a tinplate with a tin-iron alloy plated steel sheet, said method including overlapping opposite marginal portions of a blank of said surface treated steel sheet to form a can body preform having an overlapping portion, said opposite marginal portions having cut edges, and disposing said overlapping portion between a pair of wire electrodes supported by a pair of supporting electrodes for electrical resistance seam welding, the improvement which comprises:
   providing as said wire electrodes a pair of wire electrodes each having a flat surface facing said overlapping portion, and covered with metallic tin;
   applying at least to the cut edges of said marginal portions of said blank a fluxing agent promoting wetting of steel with molten tin;
   bringing said flat surfaces of said wire electrodes into contact with said overlapping portion; and
   conducting said electrical resistance seam welding in a nonoxidizing atmosphere to form a welded portion, whereby tin transferred from the surfaces of said wire electrodes covers an extruded weld portion and a remaining cut edge surface portion of said welded portion.

2. A method as set forth in claim 1, wherein said tinplate has a tin coating weight not greater than about 2.8 g/m², and the amount of said metallic tin on said wire electrodes is in the range of about 6 g/m² to about 17 g/m².

3. In a method of manufacturing a welded can body from tinplate, including overlapping opposite marginal portions of a tinplate blank to form a can body preform having an overlapping portion, said opposite marginal portions having cut edges, and disposing said overlapping portion between a pair of wire electrodes supported by a pair of supporting electrodes for electrical resistance seam welding, the improvement which comprises:
   providing as said wire electrodes a pair of wire electrodes each having a flat surface facing said overlapping portion, said flat surface being greater in width than said overlapping portion;
   applying at least to the cut edges of said marginal portions of said blank a fluxing agent promoting wetting of steel with molten tin;
   bringing said flat surfaces of said wire electrodes into contact with said overlapping portion; and
   conducting said electrical resistance seam welding in a nonoxidizing atmosphere to form a welded portion, whereby tin transferred from the surfaces of said tinplate covers an extruded weld portion and a remaining cut edge surface portion of said welded portion.

4. A method as set forth in claim 3, wherein said tinplate contains at least about 2.8 g/m² of tin on its surface.

5. In a method of manufacturing a welded can body from a tin-iron alloy plated steel sheet, said method including overlapping opposite marginal portions of a blank of said steel sheet to form a can body preform having an overlapping portion, said marginal portions having cut edges, and disposing said overlapping portion between a pair of wire electrodes supported by a pair of supporting electrodes for electrical resistance seam welding, the improvement which comprises:
   providing as said wire electrodes a pair of wire electrodes each having a flat surface facing said overlapping portion, said flat surface being greater in width than said overlapping portion, and covered with metallic tin;
   applying to the cut edges and the surfaces of said marginal portions of said blank a fluxing agent promoting the wetting of steel with molten tin;

bring said flat surfaces of said wire electrodes into contact with said overlapping portion; and conducting said electrical resistance seam welding in a nonoxidizing atmosphere to form a welded portion, whereby tin transferred from the surfaces of said wire electrodes covers an extruded weld portion and a remaining cut edge surface portion of said welded portion.

6. A method as set forth in claim 5, wherein the amount of said metallic tin on said wire electrodes is in the range of about 6 g/m$^2$ to about 25 g/m$^2$.

7. A method as set forth in claim 1, 3, or 5, wherein said fluxing agent comprises carboxylic acid.

8. A method as set forth in claim 1, 3, or 5, wherein said fluxing agent comprises a hydrohalogenic acid salt of ethanolamine.

9. A method as set forth in claim 1 or 5, wherein said tin-iron alloy plated steel sheet is a low carbon steel sheet covered with a layer composed substantially of an alloy layer of FeSn$_2$, said layer having a coating weight of 0.05 to 1.0 g/m$^2$ in terms of tin.

10. A method as set forth in claim 9, wherein said layer has a metallic tin layer on said alloy layer of FeSn$_2$, said metallic tin layer being thinner than said alloy layer of FeSn$_2$.

* * * * *